(12) United States Patent
Maricevic et al.

(10) Patent No.: US 9,118,419 B1
(45) Date of Patent: Aug. 25, 2015

(54) DIGITIZER FOR USE IN AN OVERLAY SYSTEM WITH DIGITAL OPTICAL TRANSMITTER FOR DIGITIZED NARROWCAST SIGNALS

(71) Applicant: ARRIS Enterprises, Inc., Suwanee, GA (US)

(72) Inventors: Zoran Maricevic, West Hartford, CT (US); Zhijian Sun, Avon, CT (US); Marcel F. Schemmann, Maria-Hoop (NL); Dean Painchaud, Cromwell, CT (US)

(73) Assignee: ARRIS Enterprises, Inc., Suwanee, GA (US)

( * ) Notice: Subject to any disclaimer, the term of this patent is extended or adjusted under 35 U.S.C. 154(b) by 53 days.

(21) Appl. No.: 14/153,207

(22) Filed: Jan. 13, 2014

Related U.S. Application Data

(62) Division of application No. 13/235,661, filed on Sep. 19, 2011, now Pat. No. 8,670,668.

(51) Int. Cl.
*H04B 10/00* (2013.01)
*H04B 10/2575* (2013.01)

(52) U.S. Cl.
CPC .............................. *H04B 10/25759* (2013.01)

(58) Field of Classification Search
CPC ..................... H04B 10/25759; H04B 10/2575; H04B 10/25751; H04B 10/25752
USPC .................... 398/66–68, 70–72, 76, 115, 202
See application file for complete search history.

(56) References Cited

U.S. PATENT DOCUMENTS

| | | | |
|---|---|---|---|
| 7,924,410 | B2 | 4/2011 | Fischi |
| 8,503,546 | B1 | 8/2013 | Ashrafi |
| 2002/0080884 | A1 | 6/2002 | Lee et al. |
| 2002/0164127 | A1* | 11/2002 | Barker et al. ................ 385/48 |
| 2005/0213992 | A1* | 9/2005 | Piehler ......................... 398/198 |
| 2007/0249308 | A1 | 10/2007 | Gao et al. |
| 2008/0063401 | A1 | 3/2008 | Agazzi |
| 2008/0260044 | A1 | 10/2008 | Yun et al. |
| 2009/0028564 | A1* | 1/2009 | Villarruel et al. ............. 398/66 |
| 2010/0316382 | A1* | 12/2010 | Litvin ............................. 398/79 |
| 2011/0236025 | A1 | 9/2011 | Wagner et al. |
| 2011/0255870 | A1 | 10/2011 | Grigoryan et al. |

OTHER PUBLICATIONS

Chen et al., "Experimental Verification of an Evolutionary HFC Network Architecture for Adding Narrowcast Services", 2000, IEEE Conference Publications, vol. 2, pp. 157-159.*

* cited by examiner

*Primary Examiner* — Dalzid Singh
(74) *Attorney, Agent, or Firm* — Troy A. Van Aacken

(57) ABSTRACT

Methods and apparatuses are provided to digitize an analog multi-channel RF narrowcast signal in an overlay system by dividing the signal into a plurality of subband signals and digitizing each subband signal using practical A/D converters.

5 Claims, 6 Drawing Sheets

DIGITIZER FOR USE IN AN OVERLAY SYSTEM WITH DIGITAL OPTICAL TRANSMITTER FOR DIGITIZED NARROWCAST SIGNALS

RELATED APPLICATIONS

This application is entitled to priority as a continuation application claiming the benefit of U.S. patent application Ser. No. 13/235,661, entitled "Digitizer for Use in an Overlay System with Digital Optical Transmitter for Digitized Narrowcast Signals," which was filed on Sep. 19, 2011, the entirety of which is incorporated herein by reference.

TECHNICAL FIELD

This disclosure relates to a digitizer in an overlay system.

BACKGROUND

U.S. patent application Ser. No. 13/175,681 ("the '681 patent application"), filed Jul. 1, 2011, entitled, "Overlay System With Digital Optical Transmitter For Digitized Narrowcast Signals," which is incorporated herein by reference in its entirety, discloses various implementations of improved cable-based overlay systems used to deliver high-definition digital entertainment and telecommunications such as video, voice, and high-speed Internet services from a headend to subscribers. Implementations of the improved overlay systems disclosed in the '681 patent application can use digitizers in the headend to re-digitize narrowcast analog signals after they have been QAM modulated and upconverted to radio frequency (RF) frequencies.

The implementations of the improved overlay system disclosed in the '681 patent application are not limited to any particular digitizer. For example, to re-digitize narrowcast analog signals after they have been QAM modulated and upconverted to RF frequencies, a bandpass filter can filter the narrowcast RF analog signals to filter out signals outside a desired frequency range, and the resulting signal can be converted to a digital signal by an A/D converter. The digital signal can be filtered further by another bandpass filter, downconverted to a baseband signal by a digital mixer, and low pass filtered by filter to produce a digitized signal. Then the digitized narrowcast RF signals can be converted to narrowcast RF optically modulated signals by digital narrowcast transmitters and transmitted over the overlay system to fiber nodes. Within each fiber node the narrowcast signals can be converted back to analog RF modulated signals by a converter, e.g., including an D/A converter.

The cost and availability of A/D converters used to implement the digitizers for implementations of the improved overlay system disclosed in the '681 patent application can be a limiting factor in such implementation. That is, for example, narrowcast RF analog signals input to the digitizers can have a 480 MHz-wide frequency spectrum with an upper limit of 1002 MHz. Accordingly, in such examples, the digitizer can imply an ultra high speed A/D converter having a sampling frequency of at least 2.1 GHz, for example, and a resolution of 12-bits or more.

DETAILED DESCRIPTION

Various implementations of this disclosure can operate to digitize an analog multi-channel RF narrowcast signal by dividing the signal into a plurality of subband signals. A/D converters can then be used to digitize each of the subband signals. The A/D converters used to digitize the subband signals can be more practical than high speed A/D converters.

Figure 4:
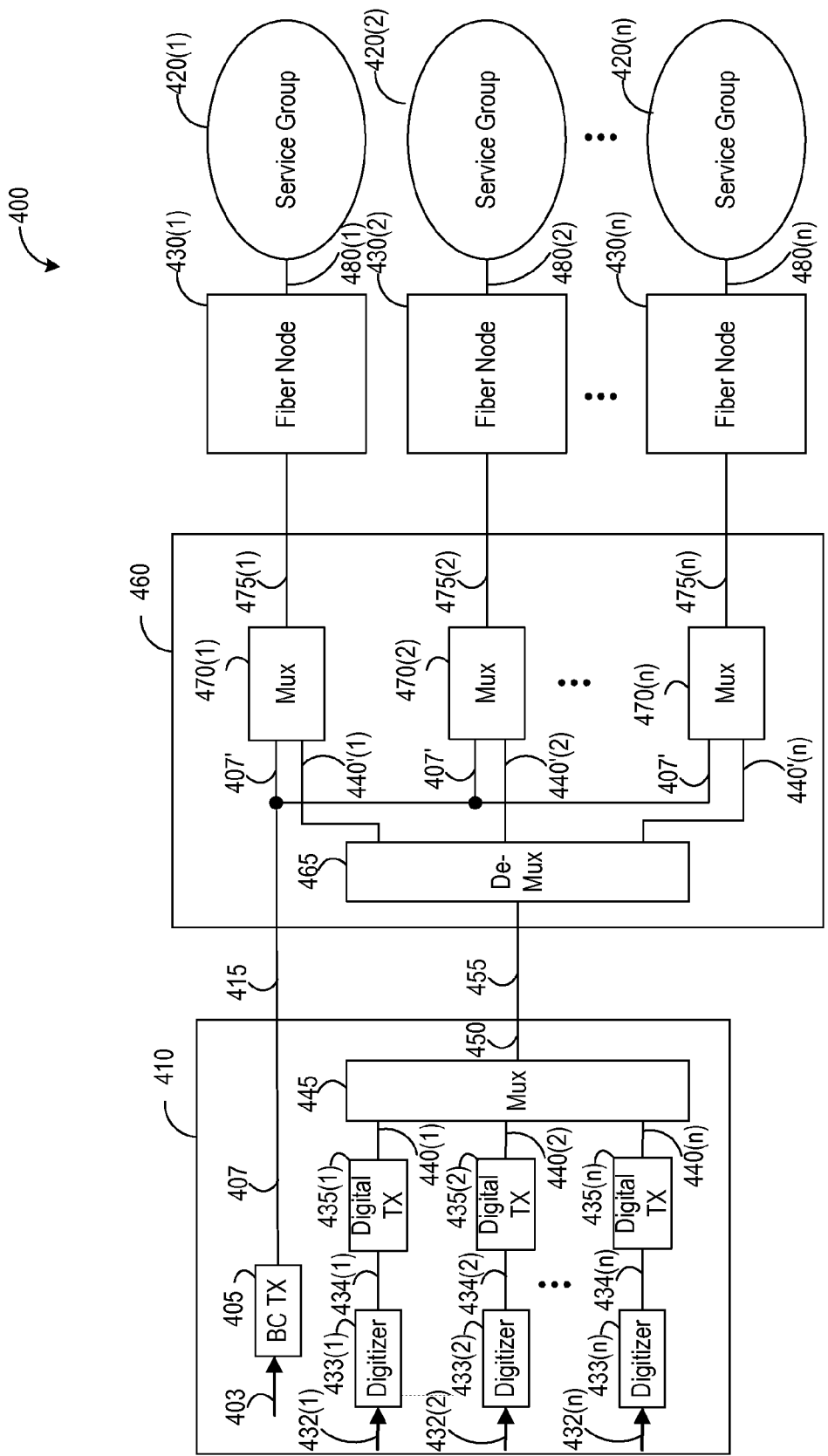
FIG. 4 is a block diagram illustrating an improved overlay system as disclosed in the '681 patent application.

FIG. 4 illustrates an example implementation of an improved overlay system as disclosed in the '681 patent application. In the headend 410, a broadcast analog optical transmitter 405 receives an analog single or multi-channel RF signal 403. The broadcast analog optical transmitter 405 converts the analog RF signal 403 to a broadcast RF optically modulated signal 407 and transmits the broadcast RF optically modulated signal 407 downstream on a first fiber 415.

Digitizers 433($i$), $i=1 \ldots, n$ receive analog-modulated single or multi-channel RF narrowcast signals 432($i$), $i=1 \ldots, n$, respectively, destined for narrowcast transmitters, and re-digitizes the analog signals. The analog RF signals 432($i$), $i=1 \ldots, n$ are derived from digital bit streams that are QAM encoded and modulated. The digitized RF signals 434 ($i$), $i=1 \ldots, n$ are received by narrowcast digital optical transmitters 435($i$), $i=1 \ldots, n$, which convert the digitized RF signals to narrowcast RF optically modulated signals 440($i$), $i=1 \ldots, n$ at particular wavelengths Ai, $i=1, \ldots n$, respectively.

An optical multiplexer 445 can combine (e.g., via dense wavelength division multiplexing) the narrowcast RF optically modulated digital signals 440($i$), ..., 440($n$) produced by the narrowcast digital optical transmitters 435(1), ..., 435($n$), respectively, to produce a multi-wavelength RF optically modulated signal 450 for transmission on a second fiber 455.

The broadcast RF optically modulated signal 407 transmitted on the first fiber 415 and the multi-wavelength RF optically modulated signal 450 transmitted on the second fiber 455 can be received at OTN 460. At the OTN 460, the narrowcast signals can be demultiplexed by an optical demultiplexer 465. For each narrowcast signal 440'($i$), $i=1, \ldots, n$ (representing narrowcast RF optically modulated signal 440 ($i$)) produced by the demultiplexer 465, an optical multiplexer 470($i$) can multiplex (e.g., via dense wavelength division multiplexing) the narrowcast signal 440'($i$) and the broadcast signal 407' (representing broadcast RF optically modulated signal 407). The resulting signal 475($i$) can be transmitted to the designated fiber node 430($i$).

Each of the fiber nodes 430($i$), $i=1, \ldots, n$ can convert the received RF optically modulated signals 475'($i$), $i=1, \ldots, n$ (representing signal 475($i$)) to electrical signals including broadcast and narrowcast services. Then the electrical signals 480($i$) can be transmitted to the corresponding service group 420($i$).

Figure 5:
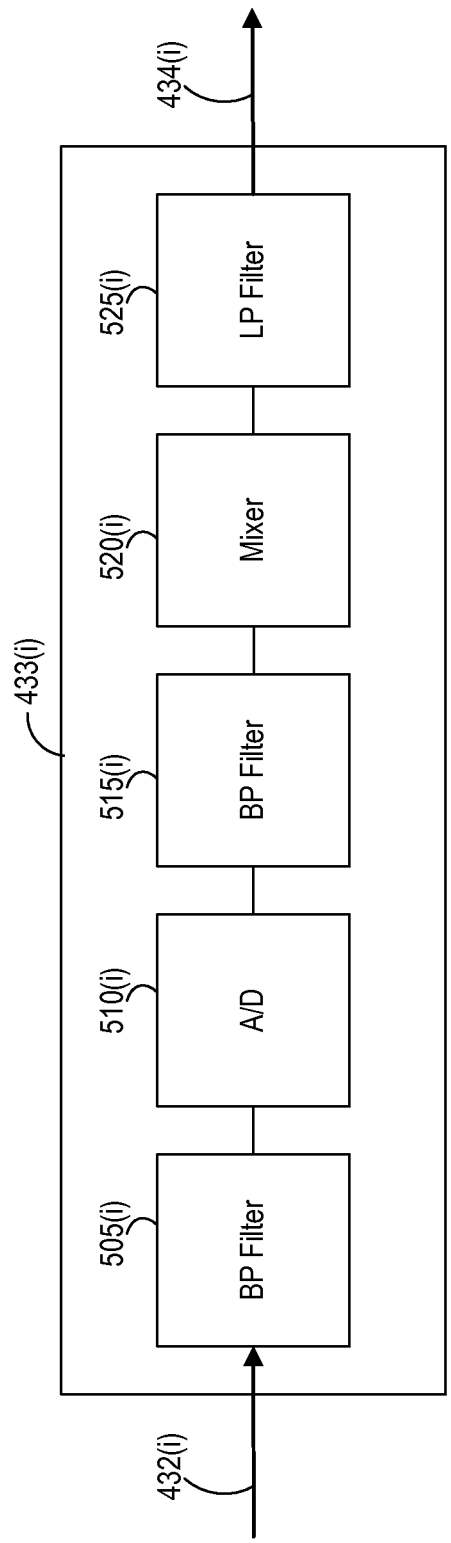
FIG. 5 is a block diagram illustrating an example implementation of the digitizers in the overlay system of FIG. 4.

FIG. 5 illustrates an example implementation of the digitizer 433($i$) in FIG. 4. A bandpass filter 505($i$) can filter the analog RF signal 432($i$) to remove signals outside the frequency range for analog RF signal 432(i). The resulting signal can be converted to a digital signal by A/D converter 510(i). The digital signal can be filtered further by bandpass filter 515(i), downconverted to a baseband signal by a digital mixer 520(i), and low pass filtered by filter 525(i) to produce a digitized signal 434(i).

As discussed above, the A/D converter (e.g., A/D converter 510(i)) used to implement the digitizers for some implementations of the improved overlay systems disclosed in the '681 patent application can be limiting. For example, the narrowcast RF analog signals (e.g., 432(i)) input to a digitizer can have a 480 MHz-wide frequency spectrum, and an upper limit of 1002 MHz. Accordingly, in some implementations, based on the Nyquist theorem, sampling is performed at two times the frequency of the sampled signal at least to avoid aliasing. Thus, the digitizer in such systems may imply an ultra high speed A/D converter having a sampling frequency of at least 2.1 GHz, for example, and a resolution of 12-bits or more. The cost and availability of such A/D converters can limit the practicality of such overlay systems.

Figure 1:
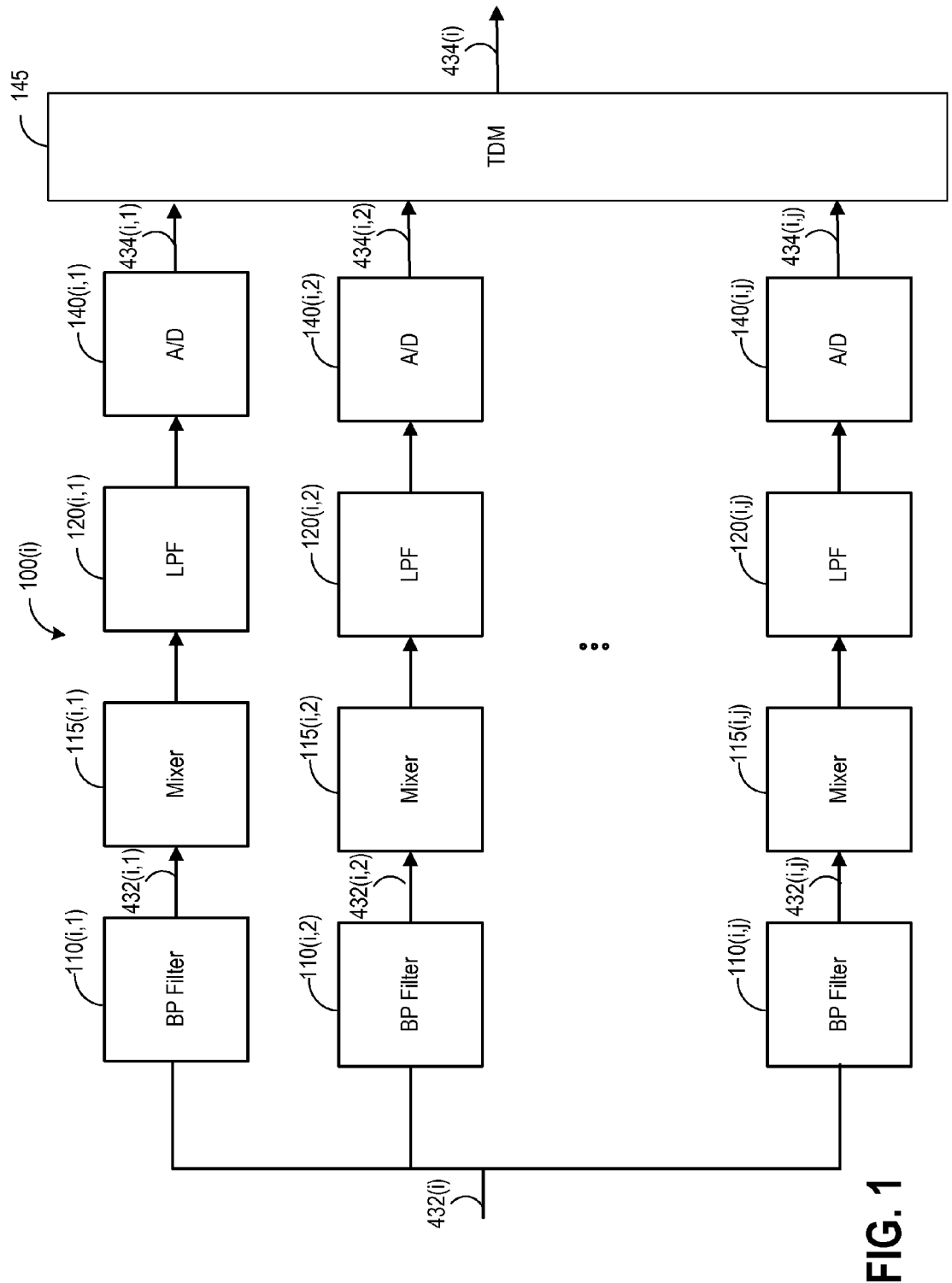
FIG. 1 is a block diagram illustrating an example implementation of an improved digitizer that can be used in overlay systems.

FIG. 1 illustrates an example implementation of an improved digitizer 100(i) that can be used in overlay systems (e.g., the overlay system of FIG. 4). The A/D converters used in the digitizer 100 can have less demanding specifications than the specifications required for A/D converters used in other implementations of the digitizer 433(i) of FIG. 1 (e.g., such as the implementation shown in FIG. 5).

Digitizer 100(i) receives an analog-modulated single or multi-channel RF narrowcast signal 432(i) and divides the signal 432(i) into M subband signals 432(i, j), j=1 . . . , M using filters (e.g., bandpass filters) 110(i,j), j=1 . . . , M, respectively. That is, the frequency spectrum, BW, of the input signal 432(i) is divided across M subband signals. Thus, the frequency spectrum of each subband signal 432(i, j), j=1 . . . , M can be BW/M. For example, the input signal 432(i) can have a 480 MHz-wide frequency spectrum including 80 6 MHz-wide QAM channels and, for M=4, each subband signal 432(i, j) can have a 120 MHz-wide frequency spectrum including 20 6 MHz-wide QAM channels. In this example, subband signal 432(i, 1) can have a frequency spectrum having a lower frequency of 522 and an upper frequency of 642; subband signal 432(i, 2) can have a frequency spectrum having a lower frequency of 642 and an upper frequency of 762; subband signal 432(i, 3) can have a frequency spectrum having a lower frequency of 762 and an upper frequency of 882; and subband signal 432(i, 4) can have a frequency spectrum having a lower frequency of 882 and an upper frequency of 1002. In various implementations, the frequency spectrum, BW, of the input signal 432(i) can be equally divided across M subband signals or unequally divided across M subband signals.

For each bank, j, of the digitizer 100(i), the subband signal 432(i, j) can be downconverted to a baseband signal by an analog mixer 115(i, j), for example, low pass filtered by filter 120(i, j), and converted to a digital signal by A/D converter 140(i, j) to produce a digitized signal 434(i, j). The digitized signals 434(i, j), j=1 . . . , M, can be time division multiplexed, for example, by processor 145 to produce the digitized signal 434(i) of FIG. 4.

The A/D converters 140(i, j) of FIG. 1 can imply a lower sampling frequency, and therefore can be less costly and more available than A/D converters (e.g., 510(i) of FIG. 5) used in other implementations of the digitizer 433(i) of FIG. 4. For example, the upper limit of the frequency spectrum of the signal 434(i, j) input to each of the A/D converters 140(i, j) of FIG. 1 is reduced; thus, the sampling frequency (e.g., at least twice the highest frequency of signal 434(i,j) ("Nyquist frequency")) of each of the A/D converters 140(i, j), respectively, can be less than the sampling frequency (e.g., at least twice the highest frequency of signal 434(i)) of the A/D converter 510(i) of FIG. 5.

Figure 2:
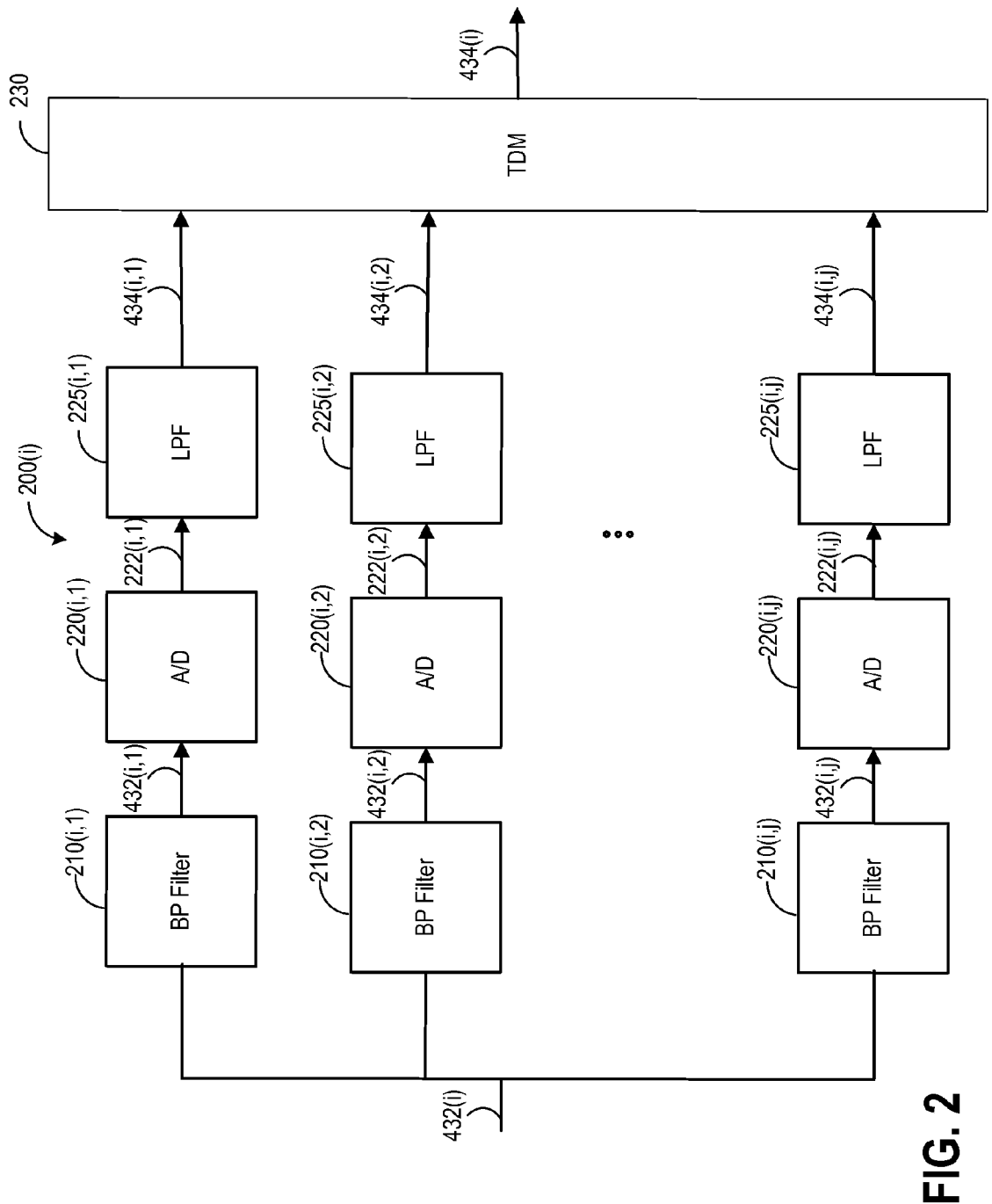
FIG. 2 is a block diagram illustrating another example implementation of an improved digitizer that can be used in overlay systems.

FIG. 2 illustrates another example implementation an improved digitizer 200(i) that can be used in overlay systems (e.g., the overlay system of FIG. 4). As with digitizer 100(i) of FIG. 1, digitizer 200(i) receives an analog-modulated single or multi-channel RF narrowcast signal 432(i) and divides the signal 432(i) into M subband signals 432(i, j), j=1 . . . , M using filters (e.g., bandpass filters) 210(j), j=1 . . . , M, respectively. For each bank, j, of the digitizer 200(i), the subband signal 432(i, j) is converted to a digital signal by A/D converter 220(i, j). Each A/D converter 220(i, j), j=1 . . . , M, can have a wide band input stage. The sample frequency of each A/D converter 220(i, j), j=1 . . . , M can be less than twice the Nyquist frequency. In other words, the subband signal 432(i, j) can be undersampled. The sample frequency of each A/D 220(i, j), j=1 . . . , M is selected such that the aliased output signal 222(i,j) can be positioned at a desired baseband frequency, thereby achieving a downconversion of the subband signal 432(i, j). Thus, the A/D converters 220(i, j) of FIG. 2 can have different sampling frequencies, which can be less than the sampling frequency of A/D converter 510(i) of FIG. 5. For each bank of the digitizer 200(i), the aliased output signal 222(i,j) then is low pass filtered by filter 225(i, j) to produce a digitized signal 434(i, j). The digitized signals 434(i, j), j=1 . . . , M, are time division multiplexed, for example, by processor 230 to produce the digitized signal 434(i) of FIG. 4.

Because of the lower sampling frequencies required for the A/D converters 140(i, j) of FIG. 1 and 220(i,j) of FIG. 2, among other things, the A/D converters of FIGS. 1 and 2 can be more practical than A/D converters (e.g., 510(i) of FIG. 5) used in other implementations of the digitizers 433(i) of FIG. 4.

Figure 6:
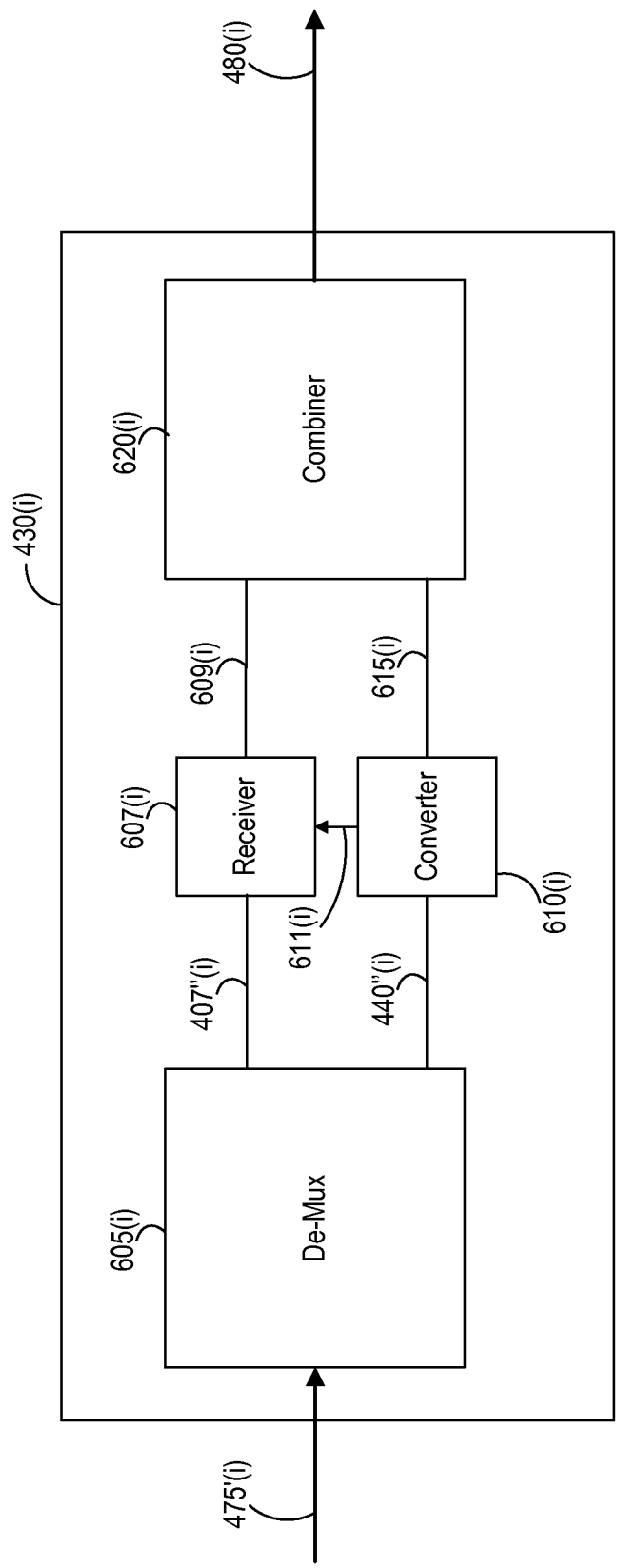
FIG. 6 is a block diagram illustrating an example implementation of the fiber nodes in the overlay system of FIG. 4.

As discussed in the '681 patent application, FIG. 6 illustrates an example implementation of the fiber nodes 430(i) of FIG. 4. In each of the fiber nodes 430(i), i=1, . . . , n, the multiplexed signal 475'(i) is demultiplexed by an optical demultiplexer 605(i) to produce a broadcast signal 407" that represents the broadcast signal 407'(i) and a narrowcast signal 440"(i) that represents the narrowcast signal 440'(i). A receiver 607(i) extracts the broadcast RF-modulated electrical signal 609(i) from the optical broadcast signal 407"(i) received from the demultiplexer 605(i). The narrowcast digital optical signal 440"(i) is converted to an analog RF-modulated electrical signal 615(i) by converter 610(i) and then the analog narrowcast signal 615(i) and the analog broadcast signal 609(i) are electrically combined by combiner 620(i) to produce electrical signal 480(i).

Figure 3:
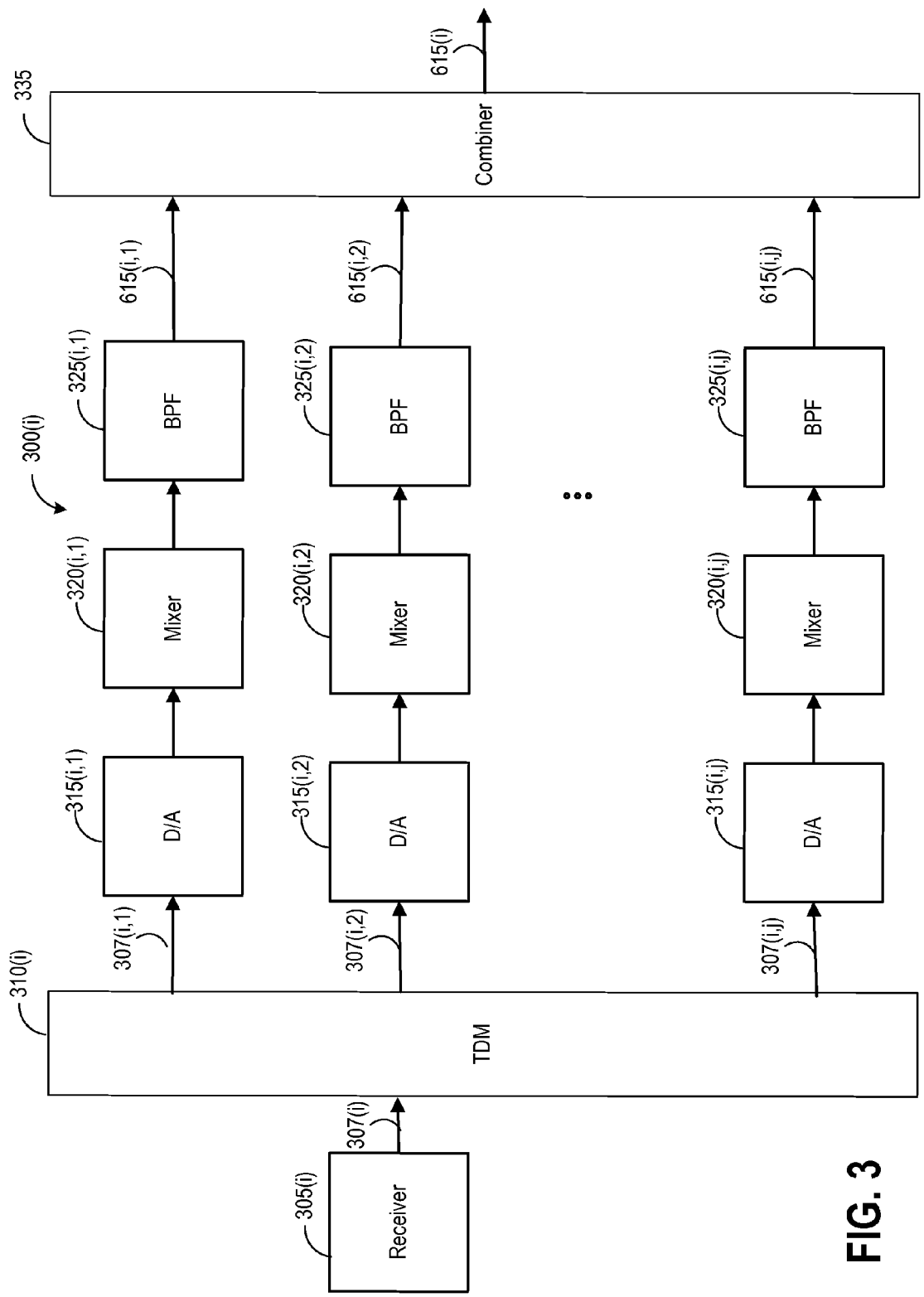
FIG. 3 is a block diagram illustrating an example implementation of a converter in a fiber node of overlay systems.

FIG. 3 illustrates an example implementation 300(i) of the converter 610(i) in the fiber node 430(i) in FIG. 6 of the overlay system 400 of FIG. 4 when the digitizer 100(i) of FIG. 1 is used for the digitizer 433(i) in the overlay system 400 of FIG. 1.

A receiver 305(i) can extract the digital signal 307(i) from the optical narrowcast signal 440"(i) received from the demultiplexer 605(i) of FIG. 6. A processor 310(i) can demultiplex the signal 307(i) and provide signals 307(i,j), j=1 . . . , M, to M D/A converters 315 (i, j), j=1 . . . , M, respectively. The signals 307(i,j) input to the D/A converters 315 (i, j), j=1 . . . , M, respectively, represent the M subband signals of the signal 307(i) where the subbands corresponding to the subbands in the digitizer 100(i). For each bank of the converter 300(i), the subband signal 307 (i,j) is upconverted to a passband signal by an analog mixer 320 (i, j), and filtered by a bandpass filter 325(i, j) to produce analog signal 615(i,j). The analog signals 615(i,j), j=1 ..., M, can be combined by combiner 335 to produce analog signal 615(i) of FIG. 6.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A fiber node, comprising:
   a receiver configured to receive and convert an optical analog-modulated signal comprising one or more up-converted analog RF signals to a first RF electrical analog signal;
   a converter configured to receive an optical digitally-modulated signal comprising one or more digital signals, produce a plurality of optical digitally-modulated subband signals from the received optical digitally-modulated signal, convert each of the plurality of optical digitally-modulated subband signals to a plurality of RF electrical analog signals, and combine the plurality of RF electrical analog signals to produce a second RF electrical analog signal; and
   a combiner configured to combine the first RF electrical analog signal and the second RF electrical analog signal.

2. The fiber node of claim 1, wherein the converter is configured to convert each of the plurality of optical digitally-modulated subband signals to an analog subband signal, upconvert each of the plurality of analog subband signals to produce the plurality of RF electrical analog signals.

3. A method, comprising:
   receiving and converting an optical analog-modulated signal comprising one or more up-converted analog RF signals to a first RF electrical analog signal;
   receiving an optical digitally-modulated signal comprising one or more digital signals;
   producing a plurality of optical digitally-modulated subband signals from the received optical digitally-modulated signal;
   converting each of the plurality of optical digitally-modulated subband signals to a plurality of RF electrical analog signals;
   combining the plurality of RF electrical analog signals to produce a second RF electrical analog signal; and
   combining the first RF electrical analog signal and the second RF electrical analog signal.

4. The method of claim 3, wherein converting each of the plurality of optical digitally-modulated subband signals to a plurality of RF electrical analog signals comprises converting each of the plurality of optical digitally-modulated subband signals to an analog subband signal, upconverting each of the plurality of analog subband signals to produce the plurality of RF electrical analog signals.

5. A fiber node, comprising:
   means for receiving and converting an optical analog-modulated signal comprising one or more up-converted analog RF signals to a first RF electrical analog signal;
   means for receiving an optical digitally-modulated signal comprising one or more digital signals;
   means for producing a plurality of optical digitally-modulated subband signals from the received optical digitally-modulated signal;
   means for converting each of the plurality of optical digitally-modulated subband signals to a plurality of RF electrical analog signals;
   means for combining the plurality of RF electrical analog signals to produce a second RF electrical analog signal; and
   means for combining the first RF electrical analog signal and the second RF electrical analog signal.

* * * * *